United States Patent [19]

Princell

[11] Patent Number: 4,794,771
[45] Date of Patent: Jan. 3, 1989

[54] SPARE TIRE LOCK

[76] Inventor: William E. Princell, 8212 Halyard Way, Indianapolis, Ind. 46236

[21] Appl. No.: 89,316

[22] Filed: Aug. 25, 1987

[51] Int. Cl.⁴ .............................................. B62D 43/04
[52] U.S. Cl. .............................................. 70/259; 70/55; 29/525.1; 224/42.23; 248/551; 248/553
[58] Field of Search ................... 70/259, 260, 54–56, 70/225, 226, DIG. 27, DIG. 56, 14, 234, 227; 248/551–553; 29/526 R; 224/42.12, 42.23, 42.24

[56] References Cited

U.S. PATENT DOCUMENTS

| | | | |
|---|---|---|---|
| 853,310 | 5/1907 | Lockwood | 248/552 |
| 1,438,656 | 12/1922 | Mahoney | 70/227 |
| 1,453,139 | 4/1923 | Huston | 70/260 |
| 1,545,902 | 7/1925 | Johnson | 70/259 |
| 1,596,176 | 8/1926 | Harland | 70/259 |
| 1,635,229 | 7/1927 | Sokolov | 70/260 |
| 1,912,872 | 6/1933 | Trautner | 70/260 |
| 3,431,756 | 3/1969 | Fennell | 70/259 |
| 3,769,821 | 11/1973 | Randel | 70/56 X |
| 3,790,012 | 2/1974 | Hrivnyak | 70/259 X |
| 3,807,204 | 4/1974 | Cucheran | 70/259 X |
| 3,818,731 | 6/1974 | Waling et al. | 70/232 |
| 3,865,264 | 2/1975 | Kuhns | 224/42.23 X |
| 3,884,057 | 5/1975 | Maurer | 70/259 |
| 4,007,863 | 2/1977 | Norris | 70/259 X |
| 4,015,761 | 4/1977 | Kokko | 224/42.24 |
| 4,060,171 | 11/1977 | Ludwig | 224/42.23 X |
| 4,068,856 | 1/1978 | Harris | 224/42.24 X |
| 4,111,344 | 9/1978 | MacDonald | 224/42.24 |
| 4,117,963 | 10/1978 | Luczynski | 224/42.12 X |
| 4,120,524 | 10/1978 | Buck, Jr. | 292/263 |
| 4,130,227 | 12/1978 | Rice | 224/42.24 |
| 4,282,995 | 8/1981 | Austin | 70/54 X |
| 4,308,733 | 1/1982 | Tampa | 70/259 |
| 4,366,923 | 1/1983 | Koch | 224/42.24 |
| 4,384,815 | 5/1983 | Suzuki et al. | 224/42.23 X |
| 4,428,513 | 1/1984 | Delmastro | 224/42.23 X |
| 4,526,021 | 7/1985 | Princell | 70/259 X |
| 4,651,543 | 3/1987 | Heald et al. | 70/54 |

FOREIGN PATENT DOCUMENTS 1173603 12/1969 United Kingdom ................ 248/552

Primary Examiner—Lloyd A. Gall
Attorney, Agent, or Firm—Woodard, Emhardt, Naughton, Moriarty & McNett

[57] ABSTRACT

A device and method for locking spare tires, such as spare tires which are raised and lowered by a winch mechanism on the undercarriages of vehicles. The device in one embodiment includes first and second flanges, which may be part of a yoke saddled over a support member, such as the shaft connected to the spare tire winch mechanism. The flanges have holes through which an upper segment of a shaft is placed and held. The lower segment of the shaft typically passes through the lug hole of the wheel, below which a lock housing is coupled to the shaft. A plurality of grooves are provided in the shaft to allow the lock housing to be placed at various positions therealong to accommodate various tire and wheel size combinations. The upper segment of the shaft may include core and tab portions which engage a hole in one of the flanges when the upper segment of the shaft is rotated in the hole. This may be accomplished using a tab having a chorded circle shape corresponding to a chorded circle profile of the hole. A resilient member, such as a poly-foam gasket, may be provided along the top of the lock housing to reduce rattling and to provide a seal against dirt and water entering the lock housing. The shaft may have a bend between the upper and lower segments.

20 Claims, 3 Drawing Sheets

SPARE TIRE LOCK

BACKGROUND OF THE INVENTION

This invention relates generally to locks and more specifically to locks used on spare tires of vehicles.

Unfortunately, theft of valuable spare tires is a pervasive problem. For example, it is not uncommon for dealers of vehicles, such as pick-up trucks, to have many spare tires stolen from the vehicles while they are parked in the dealer's lot. Also, private owners of vehicles experience similar problems.

It is particularly desirable to provide a means for locking the spare tire (and corresponding wheel) to prevent theft. It is also desirable to provide a device which can be added to already manufactured vehicles without modification to the vehicle.

Various devices have been developed to lock spare tires into place. For example, my previous patent, U.S. pat. No. 4,526,021 to Princell, is one such device in which rotation of the shaft which allows the spare tire to be hoisted down is prevented. Another such locking device is disclosed by Kuhns U.S. Pat. No. 3,865,264. Other wheel locking devices include ones disclosed by U.S. pat. No. 1,635,229 to Sokolov which has a bent shaft conforming to the camber of the wheel shape; Trautner U.S. Pat. No. 1,912,872, disclosing a lock which seals over the outside of a nut and which includes a washer-like member disclosed in FIGS. 6 and 7; and Johnson U.S. Pat. No. 1,545,902 which has a metal block lock which locks around an armored cable having a plurality of recesses therein. Other locking devices have been provided which have a shaft protruding through the axle hub hole of the wheel, such as disclosed in U.S. Pat. Nos. 3,807,204 to Cucheran, 3,431,756 to Fennell, and 3,884,057 to Maurer. Furthermore, spare tire locks are provided through lug holes in the wheel, as shown in U.S. Pat. Nos. 3,790012 to Hrivnyak, and 4,282,995 to Austin. Waling U.S. Pat. No. 3,818,731 discloses a nut covering lock for spare tires.

While each of these devices provides certain advantages, none of them provide the same advantages in the same way as the present invention. The present invention provides a simple and relatively inexpensive yet secure method and device for locking a spare tire. The present invention is especially well-suited to lock spare tires on the undercarriages of vehicles, raised and lowered by a winch mechanism, such as on pick-up trucks, and also has other applications. The present invention may be utilized in an originally manufactured vehicle design, yet may also be readily adapted to already existing vehicles without modification. The present invention also provides for a quiet, virtually rattle-free spare tire lock.

SUMMARY OF THE INVENTION

According to one embodiment, the present invention provides a spare tire lock suspended from a support member comprising means for mounting to the support member supported by the support member, the means for mounting to the support member having a noncircular hole located therein; a shaft adapted to receive a spare tire and having an upper end, the upper end including a tab portion, the tab portion having a radially outward projection, the tab portion having a shape which fits through the noncircular hole of the means for mounting to the support member, wherein the projection of the tab portion bears against the means for mounting upon insertion of the tab portion through the noncircular hole and rotation of the shaft and means for locking around the shaft.

The present invention also provides a spare tire lock suspended from a support member comprising: a first flange suspended from the support member, the first flange having a first hole; a second flange suspended from the support member, the second flange having a second hole; a shaft having an upper segment, a vertically depending lower segment, and a bend between the upper segment and the lower segment, wherein the upper segment is positioned in the first hole and the second hole, wherein the upper segment bears against a bearing surface with a first force directed generally upward and wherein the upper segment bears against the second flange at the second hole with a second force directed generally downward; and means for locking around the lower segment of the shaft.

The present invention also provides the method of locking a spare tire to a support member comprising the steps of: saddling a yoke over the support member, the yoke having a first and a second hole therein; positioning a shaft in a first position, the shaft having an upper segment and a lower segment, the upper segment being located in the first hole and the second hole when the shaft is in the first position; rotating the upper segment of the shaft to a second position in the first hole and the second hole. wherein the upper segment engages the yoke, and wherein the lower segment depends generally vertically downward from the yoke; inserting the lower segment of the shaft through a lug hole of the spare tire to be locked; and securing a lock housing around the lower segment of the shaft.

A general object of the present invention is to provide an improved spare tire lock.

Another object of the present invention is to provide an improved spare tire lock for spare tires suspended from a cable or chain winch mechanism.

Related objects of the present invention are disclosed in the following description of the preferred embodiment.

Figure 2:
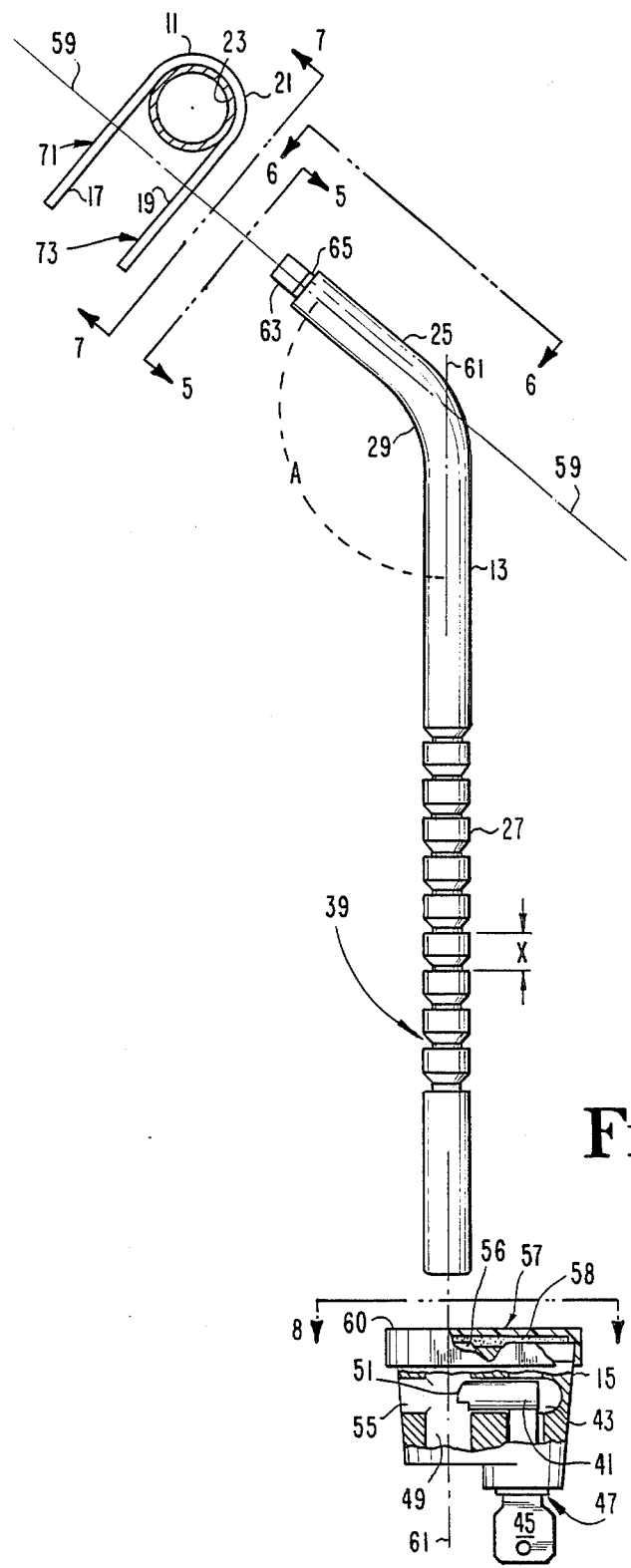
FIG. 2 shows an exploded side view of the device of FIG. 1, partially cut-away.
Figure 6:
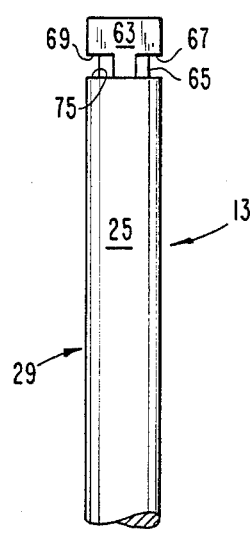
Figure 7:
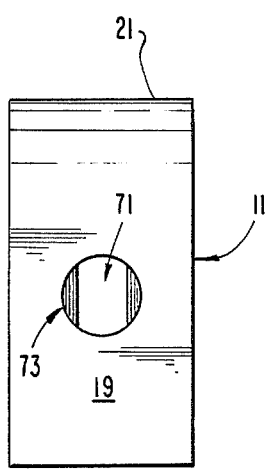
Figure 8:
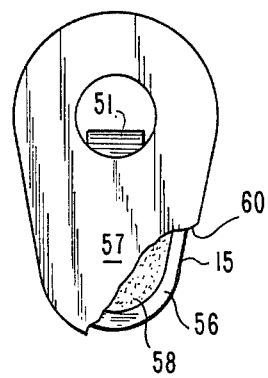

FIG. shows a partial top angular view of the device of FIG. 2 from the perspective of line 5—5 in FIG. 2;

FIG. 6 shows a partial top angular view of the device of FIG. 2 from the perspective of line 6—6 in FIG. 2;

FIG. 7 shows a partial bottom angular view of the device of FIG. 2 from the perspective of line 7—7 in FIG. 2; and FIG. 8 shows a partial cutaway top plan view of the device of FIG. 2 from the perspective of line 8—8 in FIG. 2.

DESCRIPTION OF THE PREFERRED EMBODIMENT

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
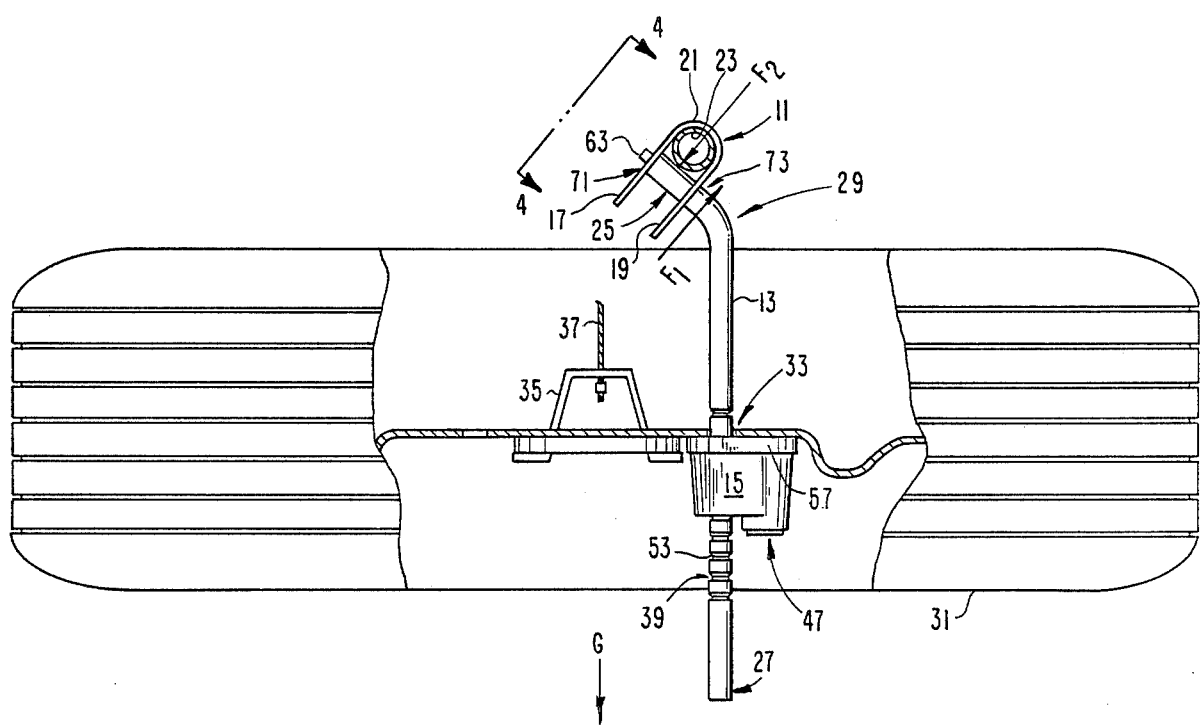
FIG. 1 shows a side elevation view of the device of the present invention locking a spare tire, shown in partial cut-away.

Referring now to FIGS. 1 and 2, the spare tire lock of the present invention includes U-shaped yoke 11, shaft 13, and lock housing 15. The U-shaped yoke in the embodiment shown is a sheet steel fabrication, about 3/32nds of an inch thick and bent around in a U-shape as shown. Yoke 11 includes flanges 17 and 19, which are joined by curved portion 21. The curved portion of U-shaped yoke 11 is saddled around support member 23. FIG. 1 illustrates support member 23 positioned in yoke 11 and in contact with shaft 13. As shown, support member 23 may typically be a hollow shaft, such as the shaft disclosed in my issued U.S. Pat. No. 4,526,021 (Reference No. 14) which is hereby expressly incorporated by reference. Although my present invention, in the best mode, is saddled over such a support member, it is entirely within the scope of my invention to use any suitable support member upon which to mount yoke 11.

Flange 17 and flange 19 each have a hole through them, through which shaft 13 passes. Shaft 13 has an upper segment 25, a lower segment 27, and a bend 29. Upper segment 25 passes through the two respective holes in yoke 11. Lower segment 27 depends downwardly below bend 29 in a direction generally parallel to gravity that is shown by the "G" arrow in FIG. 1. Both the upper and lower segments are round in cross-section, having a diameter of less than ¾ inch, and in the best mode are 0.531 inches in diameter. Shaft 13 is typically made of steel. Spare tire 31 is shown locked in position with the lower segment of shaft 13 passing through lug hole 33 of the wheel of spare tire 31. Note that, unless indicated otherwise, spare tire is used to indicate the rubber tire as well as the mounting wheel supporting the tire. Lock housing 15 provides a key actuated locking mechanism to lock around lower segment 27 of shaft 13, thus locking tire 31 in place. The majority of the weight of the spare tire is supported by bracket 35 and cable 37 as shown in FIG. 1. Bracket 35 and cable 37 are typical for providing hoist support of tire 31 and are substantially similar to bracket 27 and cable 25 as shown in FIGS. 1 and 10 of U.S. Pat. No. 3,865,264 to Kuhns, which is hereby expressly incorporated by reference. Cable 37 of FIG. 1 of the present device is shown cut-away, but it is understood to be connected to a hoist driven by support member 23. Bracket 35 is positioned in the central axle hub hole of tire 31.

The lower segment of shaft 13 includes a plurality of grooves, such as groove 39 annularly machined into the shaft. In the preferred embodiment there are ten such grooves spaced 7/16ths of an inch apart (as shown by "X" in FIG. 2) along the shaft to allow for proper placement of lock housing 15 on shaft 13. These various grooves allow lock housing 15 to lock along various positions along the lower segment of shaft 13, thereby accommodating various tire and wheel size combinations. As seen in the cut-away view of FIG. 2 lock housing 15 includes lock bolt 41 disposed in transverse bore 43. Key 45 is inserted into key hole 47 along the bottom of lock housing 15. By twisting key 45, lock bolt 41 is actuated to move reciprocally in transverse bore 43, causing bolt 41 to move in and out of shaft bore 49. Shaft bore 49 is a cylindrical vertical bore suitably sized to receive the lower segment shaft 13 therein. When shaft 13 is inserted into shaft bore 49, lock bolt 41 engages one of the grooves, such as groove 39 causing the lock housing to be secured to lower segment of shaft 13. Note that bolt 41 has a top beveled face 51 which corresponds to the bottom beveled face of the grooves, such as bottom bevel face 53 (see FIG. 1). Such beveling is typically done at a 45° angle and provides easier placement of the lock housing on shaft 13, while maintaining a secure shear resistance from downward removal of housing 15 from shaft 13.

Lock housing 15 may also have bore 55 which is in axial alignment with bore 43. Bore 55 provides for easier machining of bore 43 in lock housing 15. Diecut poly-foam insert 58 and top resilient vinyl boot 60 thereover collectively define a gasket/seal 57, located along the top of lock housing 15. Insert 57 is nested in wall 56. Boot 60 wraps over wall 56 and hooks over a steel lip formed around the top part of lock housing 15, holding boot 60 in place. Insert 58 and boot 60 may also be held in place by adhesives. Gasket/seal 57 provides a seal against dirt and water from entering the lock mechanism within housing 15. Gasket/seal 57 further provides a resilient member nested between lock housing 15 and the wheel frame around lug hole 33, thus reducing or eliminating undesirable rattling noise caused by the steel lock housing making contact against the steel wheel. Lock housing 15 is similiar to a nut lock offered by Waling Industries, Inc., 23485 Industrial Park Drive, Farmington Hills, Mich. 48024 (propane tank lock part No. HR-1/2). This nut lock is represented to be patented under U.S. Pat. No. 3,818,731, which is hereby expressly incorporated by reference. Housing 15 has a smooth surface along bore 49 (see FIG. 2) to receive shaft 13. Gasket/seal 57 may be made of various rubbers, foam, or other such resilient materials. Gasket/seal 57 is shown partially cutaway in a top view of lock housing 15 in FIG. 8. Note that gasket/seal 57 includes a circular aperture through which lower segment 27 of the shaft is received.

Referring to FIG. 2, upper segment 25 has an axial direction correspondinq to upper segment axis 59; and, lower segment 27 has an axial direction corresponding to lower segment axis 61. In the preferred embodiment, these axes intersect and define an obtuse angle "A" of about 130°, corresponding to the 130° angle of bend 29.

Figure 3:
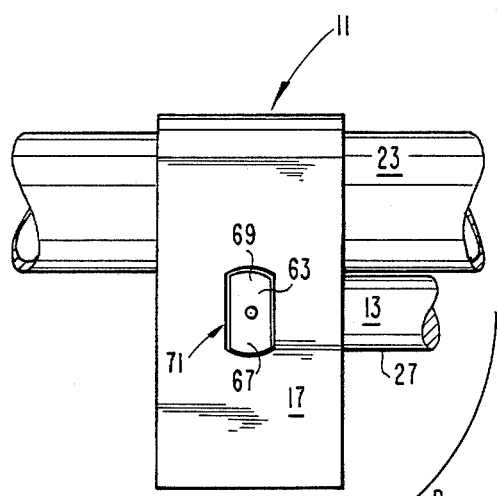
FIG. 3 shows a partial top angular view of the device of FIG. 1 in a first position, from the perspective of line 4—4 in FIG. 1.
Figure 4:
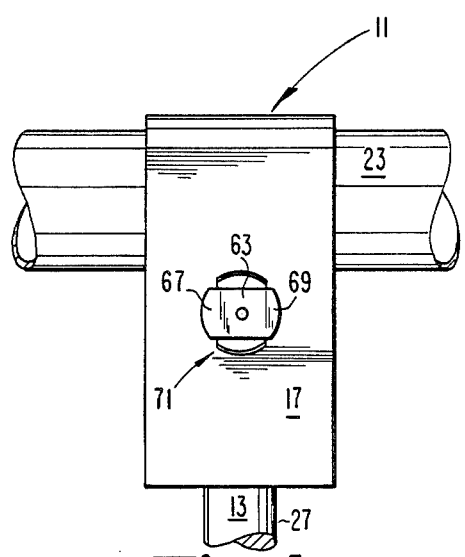
FIG. 4 shows a partial top angular view of the device of FIG. 1 in a second position, from the perspective of line 4—4 in FIG. 1.
Figure 5:
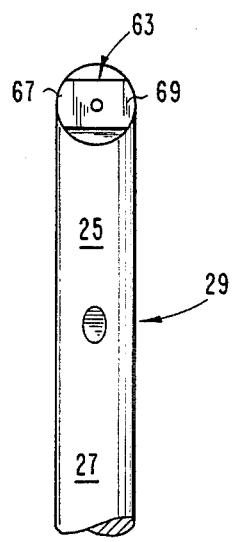

Referring now to FIGS. 3 through 7, various details are shown of shaft 13 and U-shaped yoke 11, and how they are coupled together and mounted to support member 23. At the upper end of upper segment 25, tab portion 63 extends from core portion 65. Core portion 65 is cylindrical in shape, having a smaller diameter (about 0.343 inch) than the upper segment of shaft 13. Tab portion 63 and core portion 65 are, in the preferred embodiment, cast from the same material a shaft 13, and their shape is machined therefrom. Tab 63 includes projections 67 and 69 which extend radially outwardly from core portion 65. As seen in FIG. 5. Projections 67 and 69 have outer edges curved in the arc of a circle corresponding to the diameter of upper segment 25. Tab portion 63 has a tab shape as seen in FIG. 5 which is essentially defined by the geometric intersection of a circle and two parallel lines. For reference, this shape shall be defined as a parallel corded circle. This corded circle shape is also seen in FIG. 3 in which tab 63 is shown projecting through hole 71. Hole 71 has a corded circle profile which corresponds to the corded circle shape of tab 63. Althouqh the corded circle shape and profile are corresponding, tab 63 is slightly smaller than hole 71, allowing the tab to pass through the hole. By comparing FIGS. 3 and 4, the preferred method by which shaft 13 is coupled to yoke 11 is shown. In FIG. 3, tab 63 on the upper end of shaft 13 is inserted through hole 73 (see FIG. 7) and through hole 71 as shown. Then, shaft 13 is rotated, as shown by arrow "R" downwardly 90° causing tab 63 to rotate above hole 71. From this first position shown in FIG. 3, shaft 13 is moved to a second position as shown in FIG. 4. Tab 63 is correspondingly rotated 90° with projections 69 and 67 overlapping and contacting flange 17 of yoke 11. Consequently, in the second position as shown in FIG. 4, tab 63 prevents axial withdrawal of shaft 13 from hole 71. Similarly, shoulder 75, as shown in FIG. 6, prevents further axial insertion of shaft 13 through hole 71. In the second position of shaft 13 as depicted in FIGS. 4 and 1, lower segment 27 of shaft 13 depends vertically downward in the direction of gravity "G". As seen in FIG. 1, although a portion of the weight of tire 31 is carried by bracket 35, the weight of lock housing 15 and shaft 13, and part of the weight of tire 31 are carried by yoke 11. Upper segment 25 protrudes through flanges 17 and 19 in a perpendicular orientation, which is 50° out of plumb with vertical. Accordingly, the downward acting force, due to the weight carried in lower segment 27, coupled with the geometry occasioned by bend 29 create an eccentricity in the forces acting on shaft 13. Shaft 13 acts as a lever about a fulcrum on the inner surface of hole 73. Accordingly, reaction forces "$F_1$" and "$F_2$" (see FIG. 1) respectively occur in hole 73 and on upper segment 25 in contact with support member 23 at a bearing surface. The bearing surface is that surface of member 23 which is contacted by segment 25 as shown in the best mode of FIG. 1. Note that, while not preferred, it would be possible to have the bearing surface be the inside of hole 71 on flange 17. Reaction forces $F_1$ and $F_2$ act against shaft 13, $F_2$ bearing against segment 25 inbetween core portion 65 and bend 29. As known in mechanics, these reaction forces are met with an equal and opposite force from the shaft bearing against the flange and the support member. Segment 25 acts generally upward on support member 23 and generally downward on the flange at hole 73. Accordingly, the downward acting forces, due to the action of gravity "G", are resisted by forces acting radially inward on upper segment 25. This reduces or eliminates the weight being carried in shaft 13 from concentrating on the bottom sides of projection 67 and 69 which, in the embodiment disclosed, are thinner and commensurately weaker than the cross-sectional diameter of upper segment 25. Note that the arrangement as disclosed in FIG. 1 would result in force $F_1$ being of a greater magnitude than $F_2$. Furthermore, this arrangement is desirable since rotation "R" as shown in FIG. 3 occurs along upper segment axis 59 as shown in FIG. 2. Consequently, when lower segment 27 is positioned in lug hole 33, as shown in FIG. 1, the metal wheel surrounding lug hole 33 prevents pivoting of upper segment 25 about upper segment axis 59. Consequently, it is impossible to disengage projections 67 and 69, as shown in FIG. 3, without first removing tire 31 downwardly off of lower segment 27. However, lock housing 15 (which is locked around lower segment 27) impedes downward movement of tire 31. Consequently, to remove tire 31 and/or to remove shaft 13 and yoke 11 from support member 23, the user must unlock lock housing 15 using key 45.

The various geometries of parts, such as yoke 11 and shaft 13, may be varied while still practicing the spirit of the present invention. Furthermore, flanges 17 and 19 may be welded to a specially fabricated support member attached to the undercarriage of a vehicle.

FIG. 7 shows yoke 11 with flange 19. Flange 19 has circular hole 73 therein which is in axial alignment with corded circle profiled hole 71. Note that the corded circle profile of hole 71 and the corded circle shape of tab 63 are elongated and noncircular.

The method used to lock spare tire 31 to support member 23 is as follows. First, the user saddles yoke 11 over support member 23 so that holes 71 and 73 are saddled beyond member 23. Next, upper segment 25 of shaft 13 is positioned in a first position, as seen in FIG. 3, through holes 71 and 73, such that tab 63 extends above and beyond flange 17, as shown in FIG. 1. In this first position, upper segment 25 is located in both holes 71 and 73, with hole 71 adjacent to core 65. Next, shaft 13 is rotated, as shown by arrow "R" in FIG. 3. 90° downwardly to a second position as shown in FIG. 4. In this second position, upper segment 25 is in holes 71 and 73, engaging yoke 11, with lower segment 27 depending vertically downward from yoke 11. Next, tire 31 is hoisted by a cable 37 and bracket 35, with lower segment 27 being aligned with lug hole 33. Lower segment 27 of shaft 13 is inserted through lug hole 33 of tire 31. Finally, lock housing 15 is secured around lower segment 27 of shaft 13 by sliding the housing upward onto shaft 13. Note that lock bolt 41 is spring biased in a locked position by a compressional spring. Due to sliding engagement of beveled faces 51 and 53, the lock housing can be moved upwards in a locked position without use of key 45. This process may include the step of pushing lock housing 15 upwardly, such that gasket/seal 57 is nested against the wheel to be locked. This nesting reduces rattling and corresponding noise. Gasket/seal 57 also prevents moisture and dirt from entering the top of the lock housing.

Removal of the lock housing requires actuating key 45 to unlock lock bolt 41 in housing 15 by disengaging the grooves, such as groove 39, along lower segment 27.

While the invention has been illustrated and described in detail in the drawings and foregoing description, the same is to be considered as illustrative and not restrictive in character it being understood that only the preferred embodiment has been shown and described and that all changes and modifications that come within the spirit of the invention are desired to be protected.

What is claimed is:

1. A spare tire lock suspended from a support member comprising:
   means for mounting to the support member supported by the support member, said means for mounting to the support member having a noncircular hole located therein;
   a shaft adapted to receive a spare tire and having an upper end, said upper end having an axis and including a tab portion, said tab portion having a radially outward projection, said tab portion having a shape which, when said upper end is moved axially, fits through said noncircular hole of said means for mounting to the support member, wherein said projection of said tab portion bears against said means for mounting upon insertion of said tab portion through said noncircular hole and rotation of the upper end of said shaft about said axis; and means for locking around said shaft.

2. The lock of claim 1 wherein said shaft has a lower end and a bend, said lower end having a lower axis, and wherein the axis of said upper end and said lower axis are nonparallel.

3. The lock of claim 1 wherein said shaft includes a plurality of grooves adapted to receive said means for locking at various positions along said lower end of said shaft.

4. The lock of claim 1 wherein said first hole has a first hole profile of a chorded circle, and wherein said tab portion's shape is a chorded circle corresponding to said first hole profile.

5. A spare tire lock suspended from a support member comprising:

means for mounting to the support member supported by the support member, said means for mounting to the support member having a noncircular hole located therein;

a shaft adapted to receive a spare tire and having an upper end, said upper end having an axis and including a tab portion, said tab port having a radially outward projection, said tab portion having a shape which when said upper end is moved axially, fits through said noncircular hole of said means for mounting to the support member, wherein said projection of said tab portion bears against said means for mounting upon insertion of said tab portion through said noncircular hole and rotation of the upper end of said shaft about said axis;

means for locking around said shaft, and a resilient member coupled to said means for locking and adapted to bear between said means for locking and the spare tire to be locked.

6. A spare tire lock suspended from a support member comprising:

means for mounting to the support member supported by the support member, said means for mounting to the support member having a noncircular hole located therein;

a shaft adapted to receive a spare tire and having an upper end, said upper end including a tab portion, said tab portion having a radially outward projection, said tab portion having a shape which fits through said noncircular hole of said means for mounting to the support member, wherein said projection of said tab portion bears against said means for mounting upon insertion of said tab portion through said noncircular hole and rotation of said shaft;

means for locking around said shaft, and means for mounting to the support member comprising a U-shaped yoke, said yoke further having a second hole located therein, and wherein said yoke is saddlable around the support member with said shaft positioned in said second hole.

7. The lock of claim 6 wherein said shaft has a lower end and a bend, said upper end having an upper axis, said lower end having a lower axis, wherein said upper axis and said lower axis are nonparallel.

8. The lock of claim 7 wherein said shaft includes a plurality of grooves adapted to receive said means for locking at various positions along said lower end of said shaft.

9. The lock of claim 8 and further comprising a resilient member coupled to said means for locking and adapted to bear between said means for locking and the spare tire to be locked.

10. The lock of claim 9 wherein said first hole has a first hole profile of a chorded circle, and wherein said tab portion's shape is a chorded circle corresponding to said first hole profile.

11. The lock of claim 10 wherein said second hole is circular, wherein said upper axis and said lower axis form an angle of about one-hundred and thirty degrees, wherein said means for locking includes a shaft bore for receiving said shaft, and wherein said lower end of said shaft has a round cross section and a shaft diameter of less than three-fourths of one inch.

12. A spare tire lock suspended from a support member comprising:

a first flange suspended from the support member, said first flange having a first hole;

a second flange suspended from the support member, said second flange having a second hole;

a shaft having an upper segment, a vertically depending lower segment, and a bend between said upper segment and said lower segment, wherein said upper segment is positioned in said first hole and said second hole wherein said upper segment bears against a bearing surface with a first force directed generally upward and wherein said upper segment bears against said second flange at said second hole with a second force directed generally downward and means for locking around said lower segment of said shaft.

13. The lock of claim 12 wherein said first hole is noncircular and in axial alignment with said second hole.

14. The lock of claim 13 wherein lower segment of said shaft is downwardly depending and has a plurality of grooves therein adapted to receive said means for locking at various positions along said lower segment.

15. The lock of claim 14 wherein said first flange and said second flange are coupled by a curved portion forming a yoke saddled around the support member.

16. The lock of claim 12 wherein lower segment of said shaft is downwardly depending and has a plurality of grooves therein adapted to receive said means for locking at various positions along said lower segment.

17. The method of locking a spare tire to a support member comprising the steps of:

saddling a yoke over the support member, said yoke having a first and a second hole therein;

positioning a shaft in a first position, said shaft having an upper segment and a lower segment, said upper segment being located in said first hole and said second hole when said shaft is in said first position;

rotating said upper segment of said shaft to a second position in said first hole and said second hole, wherein said upper segment engages said yoke, and wherein said lower segment depends generally vertically downward from said yoke;

inserting said lower segment of said shaft through a lug hole of the spare tire to be locked; and securing a lock housing around said lower segment of said shaft.

18. The method of claim 17 wherein said securing step includes the step of upwardly sliding bevel faced lock bolt in said lock housing to engage one of a plurality of grooves along said lower segment of said shaft.

19. The method of claim 18 and further comprising the step of nesting a resilient member coupled to said lock housing against the spare tire to be locked.

20. The method of claim 19 wherein said rotating step includes the step of rotating said upper segment of said shaft about ninety degrees, wherein said shaft includes a bend, and wherein said upper segment includes a core portion and a tab portion, said tab portion having a projection radially outward from said core portion, said tab portion having a chorded circle shape which fits through said first hole of said yoke, said first hole having a chorded circle profile corresponding to said shape of said tab portion.

* * * * *

UNITED STATES PATENT AND TRADEMARK OFFICE
CERTIFICATE OF CORRECTION

PATENT NO.   : 4,794,771
DATED        : January 3, 1989
INVENTOR(S)  : William E. Princell It is certified that error appears in the above-identified patent and that said Letters Patent is hereby corrected as shown below:

In Column 2, at line 58, insert "5" after "FIG.".

In Column 7, at line 30, replace "port" with --portion--.

Signed and Sealed this

Sixth Day of June, 1989

Attest:

DONALD J. QUIGG

Attesting Officer

Commissioner of Patents and Trademarks